Patented Feb. 11, 1930

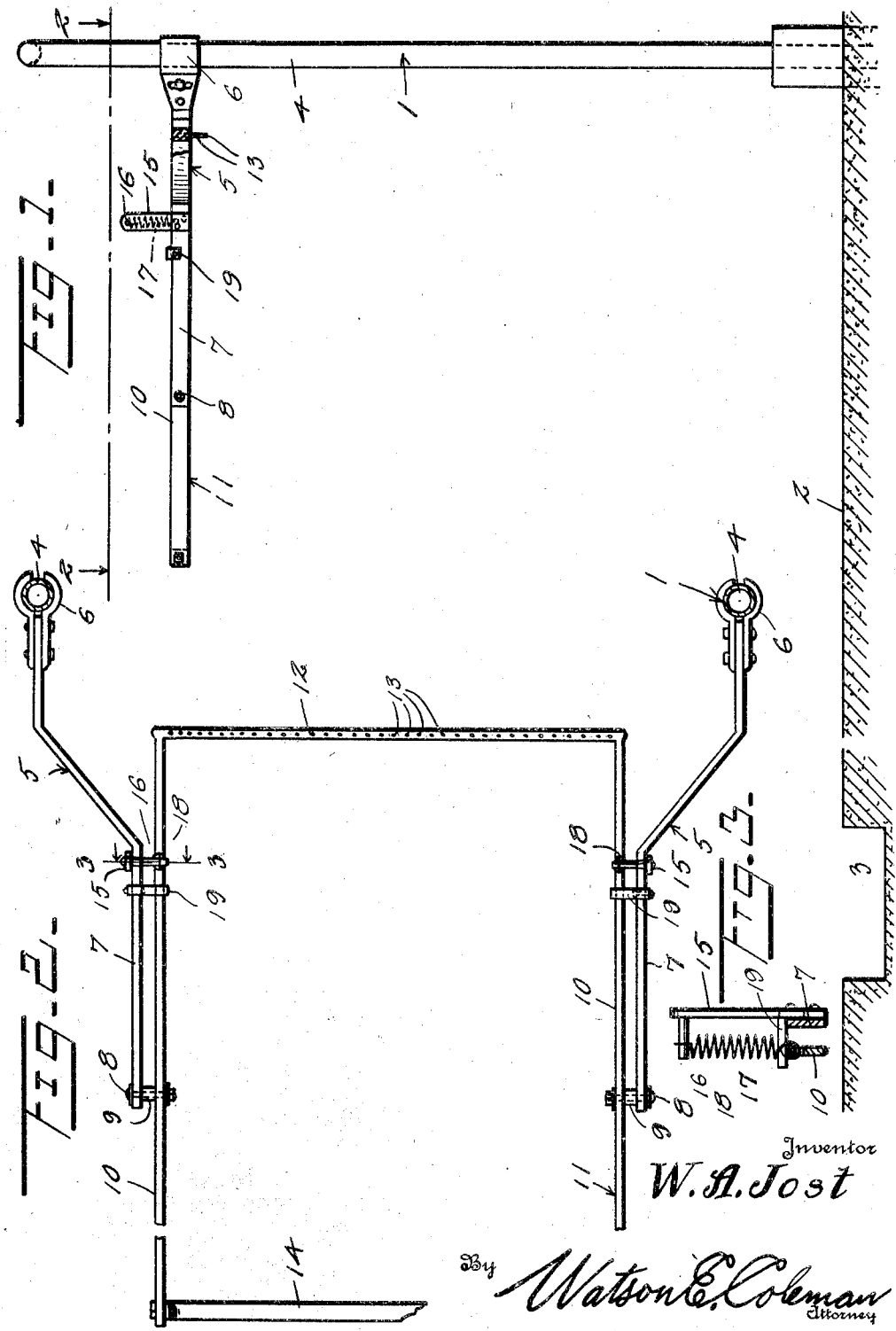

1,746,770

UNITED STATES PATENT OFFICE

WILLIAM A. JOST, OF MANSFIELD, MANSFIELD TOWNSHIP, FREEBORN COUNTY, MINNESOTA

COW TRAINER

Application filed May 2, 1929. Serial No. 359,939.

This invention relates to the class of animal husbandry and pertains particularly to a training device for cows.

The primary object of the present invention is to provide a device which will compel cows to step back in their stalls when making use of the sewerage disposal gutters adjacent thereto, so that the stalls will be kept in a clear and sanitary condition.

Another object of the invention is to provide a means for training cows in the manner above described, which will be effective in obtaining the desired results without hurting or injuring the cow.

The invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a longitudinal sectional view through a stall showing the application of the present invention to the stanchion frame thereof;

Figure 2 is a sectional view taken upon the line 2—2 of Figure 1;

Figure 3 is a sectional view taken upon the line 3—3 of Figure 2.

Referring to the drawing in detail wherein like numerals of reference indicate corresponding parts throughout the several views, Figure 1 shows a side elevational view of a stall frame which is indicated as a whole by the numeral 1 and which normally carries the stanchion (not shown) by means of which the cow is held in the stall. The floor of the stall is indicated at 2 and the drop or gutter in which the sewerage from the stall is conveyed away is indicated at 3.

The device embodying the present invention is secured to and carried by the upright side members 4 of the stall frame and it comprises a pair of arms 5, each of which carries at one end, a clamp 6, which is designed to grip a stall post in the manner shown in Figure 2, the other ends of the arms having a substantial portion thereof, indicated by the numeral 7, inset with respect to the clamp carrying portions and arranged in spaced parallel relation in the manner shown.

These free end portions 7 of the trainer arms carry at each end, an inwardly extending pin 8 surrounded by a suitable bushing 9, which pins pass through the side bars 10 of an elongated rectangular frame indicated as a whole by the numeral 11. This frame 11 is horizontally supported between the arms as shown, and the pins 8 engage the bars 10 upon the rear side of the transverse center of the frame so that the forward end, or that end nearest the cow's head will slightly over-balance the rear end.

The forward end bar 12 of the frame 11 has the under face thereof provided with a plurality of downwardly extending pegs 13, these pegs being preferably of substantially the same length. The rear bar 14 of the frame is of plain flat metal and when the cow is in the stall positions at approximately one-half inch above the cow's back, the front bar 12 clears the shoulders of the cow about two inches.

The arms 5 adjacent the forward ends of the portions 7 each carry an upright plate 15 to the upper end of which is attached, as at 16, one end of a spring 17, the lower end of the spring being attached to the side bar 10 adjacent thereto, as indicated at 18.

Adjacent each of the plates 15, there is supported upon each of the side members 7, a stop 19 which limits the upward movement of the forward portion of the frame 11 in the manner shown in Figure 3.

In use, when the cow in the stall humps her back for use of the sewerage disposal gutter, the back will strike the bar 14 to cause the forward end thereof to be swung downwardly, bringing the pins 13 into contact with the animal's shoulders. This will cause the animal to step back into the stall so that the offal will be received in the gutter and the stall will thus be prevented from becoming dirtied and unsanitary.

It is, of course, to be understood that the post gripping clamps 6 of the trainer device may be easily loosened for the adjustment of the device vertically upon the stall bars to adapt it to cows of different heights.

From the foregoing it will be seen that as soon as the cow's hind quarters are free from contact with the bar 14 the spring 17 will act to raise the forward bar 12 so that the cow can move forwardly again into the stall.

It will be readily seen that by the use of the trainer device embodying this invention, that in a short period of time the cow will be trained so that at all times when the sewerage gutter is to be made use of she will step back in the stall as described.

While I have shown a clamp for the arms 5 comprising a pair of members formed to fit about a stanchion bar 1 in the manner shown, it is, of course, to be understood that I do not wish to be limited in any manner to the use of clamps of this character as it is obvious that other clamping means may be advantageously employed.

Having thus described my invention, what I claim is:—

1. A cow trainer, comprising a pair of supporting arms each adapted to be mounted on a fixed portion of a stall, an elongated frame, means for oscillatably supporting the frame between said arms, and means carried by the arms and engaging the frame for normally maintaining the frame in horizontal position, said frame having a portion adapted to strike the animal when the frame is oscillated.

2. A cow trainer, comprising a pair of supporting arms each adapted to be mounted on a fixed portion of a stall, an elongated frame, means for oscillatably supporting the frame between said arms, means carried by the arms and engaging the frame for normally maintaining the frame in horizontal position, and pointed members carried by a portion of the frame for engaging an animal's back when the frame is oscillated to cause the animal to move as desired.

3. A cow trainer, comprising a pair of supporting arms adapted to be secured to a suitable support at opposite sides of a stall, pivot pins carried by said arms adjacent the free ends thereof, an elongated frame mounted upon said pins and having a forward and a rear cross bar, pin members carried by the forward bar and directed downwardly therefrom, resilient means carried by the arms and engaging the frame for normally maintaining it in substantially horizontal position, and movement limiting elements for the frame carried by said arms.

In testimony whereof I hereunto affix my signature.

WILLIAM A. JOST.